United States Patent [19]

Lettau et al.

[11] Patent Number: 4,913,876
[45] Date of Patent: Apr. 3, 1990

[54] NUCLEAR REACTOR FUEL ASSEMBLY

[75] Inventors: Hans Lettau, Effeltrich; Gerhard Preusche; Guenther Lill, both of Herzogenaurach, all of Fed. Rep. of Germany

[73] Assignee: Siemens Aktiengesellschaft, Munich, Fed. Rep. of Germany

[21] Appl. No.: 178,130

[22] Filed: Apr. 6, 1988

[30] Foreign Application Priority Data

Apr. 6, 1987 [DE] Fed. Rep. of Germany ... 371153617

[51] Int. Cl.$^4$ ............................................. G21C 3/32
[52] U.S. Cl. .................................... 376/444; 376/439
[58] Field of Search ...................... 376/439, 443, 444

[56] References Cited

U.S. PATENT DOCUMENTS

| | | | |
|---|---|---|---|
| 3,808,098 | 4/1974 | Fredin | 376/444 |
| 4,587,093 | 5/1986 | Borrman | 376/444 |
| 4,626,405 | 12/1986 | Field | 376/448 |
| 4,675,154 | 6/1987 | Nelson | 376/444 |
| 4,740,350 | 4/1988 | Taleyarkhan | 376/441 |
| 4,781,885 | 11/1988 | Lill | 376/444 |

FOREIGN PATENT DOCUMENTS 0200111 11/1986 European Pat. Off. .
0204288 12/1986 European Pat. Off. .
3533317 3/1987 Fed. Rep. of Germany .

*Primary Examiner*—Donald P. Walsh
*Attorney, Agent, or Firm*—Herbert L. Lerner; Laurence A. Greenberg

[57] ABSTRACT

A nuclear reactor fuel assembly includes an elongated fuel assembly box. Fuel rods containing nuclear fuel are mutually spaced apart in the fuel assembly box and parallel to the longitudinal direction of the fuel assembly box. A water tube inside the fuel assembly box is parallel to the fuel rods. The water tube has a lower end with an inlet opening and an upper end with an outlet opening for liquid water. A shield is fastened inside the water tube and spaced apart from both of the ends of the water tube. A flowthrough opening is formed in the shield or between the shield and the water tube for the liquid water.

8 Claims, 3 Drawing Sheets

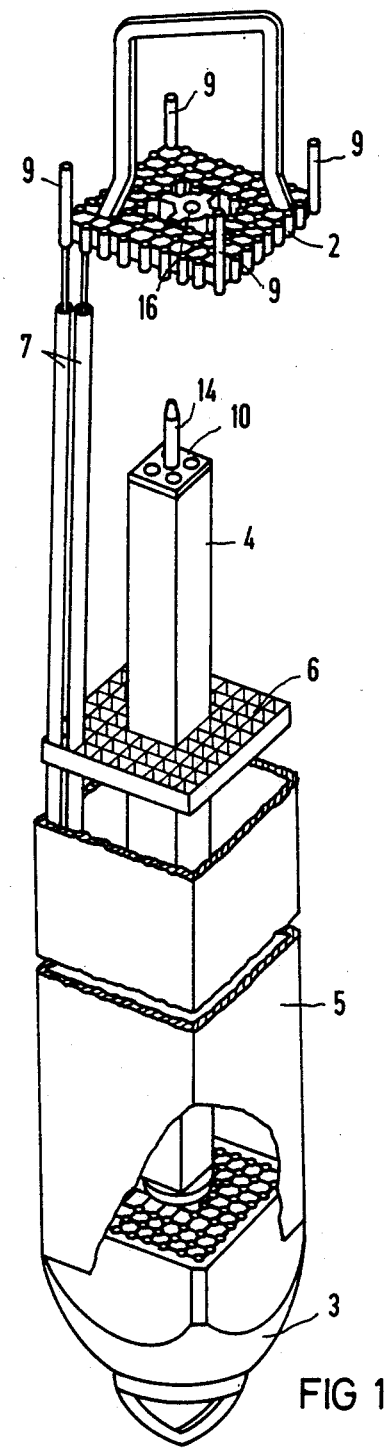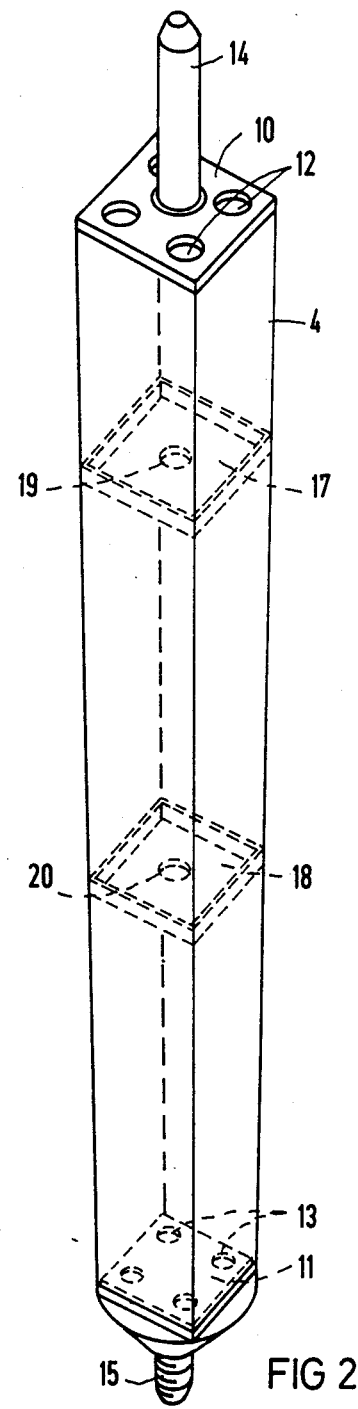
FIG 1
FIG 2

NUCLEAR REACTOR FUEL ASSEMBLY

The invention relates to a nuclear reactor fuel assembly including an elongated fuel assembly box, fuel rods containing nuclear fuel being mutually spaced apart in said fuel assembly box and parallel to the longitudinal direction of said fuel assembly box, and a water tube inside said fuel assembly box parallel to the fuel rods, said water tube having a lower end with an inlet opening and an upper end with an outlet opening for liquid water.

A nuclear reactor fuel assembly of this kind is known from U.S. Pat. No. 3,808,098. This prior art fuel assembly is intended for a boiling water reactor. The water tube or pipe thereof is a hollow cylinder and is disposed in a decentralized manner in the nuclear reactor fuel assembly. The water tube or pipe forms an internal channel through which liquid water flows in the boiling water reactor over the entire length of the fuel assembly, without boiling. As a result, the liquid water in the water tube or pipe provides improved distribution of moderator and nuclear fuel and therefore an improved distribution of the flow of thermal neutrons, thus bringing about increased reactivity in the reactor core of the boiling water reactor. This leads to an improved utilization of the nuclear fuel used.

The water tube or pipe, as a rule, is a relatively thin-walled tube made of a zirconium alloy, it may either be open at both ends or closed at least at one end and it may have bores at one or both ends that maintain a flow of liquid water through the water tube or pipe. On one hand, the liquid water flow through the water tube or pipe in the boiling water reactor must be great enough to keep the liquid water in the water tube or pipe just below the boiling point. On the other hand, the water tube or pipe should divert no more liquid water away from the cooling of the fuel rods of the fuel assembly than is necessary.

In other words, while the liquid water pressure in the water tube or pipe has virtually the same value from the water inlet, which as a rule is the lower end, to the water outlet, which as a rule is the upper end, there is a pressure drop in the boiling water reactor coolant on the outside of the water tube or pipe from the water inlet end to the water outlet end of the water tube or pipe, resulting from friction at the fuel rods of the fuel assembly and impact losses, such as at grid-like spacers for the fuel assembly fuel rods. As a result there is a difference in the pressures on the inside and outside of the water tube or pipe, which requires that the wall of the water tube or pipe be of considerable thickness.

It is accordingly an object of the invention to provide a nuclear reactor fuel assembly, which overcomes the hereinafore-mentioned disadvantages of the heretofore-known devices of this general type and which makes it possible to have a water tube or pipe wall with only a slight thickness.

With the foregoing and other objects in view there is provided, in accordance with the invention, a nuclear reactor fuel assembly, comprising an elongated fuel assembly box, fuel rods containing nuclear fuel being mutually spaced apart in the fuel assembly box and parallel to the longitudinal direction of the fuel assembly box, a water tube inside the fuel assembly box parallel to the fuel rods, the water tube having a lower end with an inlet opening and an upper end with an outlet opening for liquid water, a shield fastened inside the water tube and spaced apart from both of the ends of the water tube, and a flowthrough opening formed in the shield or between the shield and the water tube for the liquid water.

The screen or shield which forms the flowthrough opening for the liquid water enables a stepwise pressure drop to be attained in the water tube or pipe, beginning at the water inlet opening. The course of the pressure inside the water tube or pipe can be made to approximate the course of the pressure on the outside of the water tube or pipe. Correspondingly, the wall thickness of the water tube or pipe can be selected to be relatively slight, so that only a small amount of material is needed for the water tube or pipe. The water tube or pipe accordingly absorbs fewer thermal neutrons, but affords a greater volume for the moderator substance which is the liquid water.

In accordance with another feature of the invention, there is provided another shield fastened inside the water tube and spaced apart from both of the ends of the water tube, and another flowthrough opening formed in the other shield or between the other shield and the water tube for the liquid water.

In accordance with a further feature of the invention, there is provided an end shield fastened inside one of the ends of the water tube, the end shield having a flowthrough opening formed therein for the liquid water.

In accordance with an added feature of the invention, there are provided two end shields each being fastened inside a respective one of the ends of the water tube, one of the end shields having the outlet opening formed therein and the other of the end shields having the inlet opening formed therein for the liquid water.

In accordance with a concomitant feature of the invention, the shield is a metal sheet secured to the water tube.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, partially exploded and partially broken away perspective view of the skeleton of a nuclear reactor fuel assembly according to the invention;

FIG. 2 is a perspective view of the water tube or pipe of the fuel assembly of FIG. 1;

Figure 3:
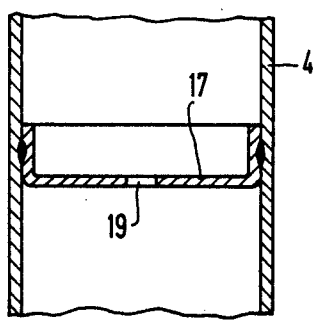
FIG. 3 is a fragmentary, longitudinal-sectional view of the water tube or pipe of FIG. 2.

Referring now to the figures of the drawings in detail and first, particularly, to FIG. 1 thereof, there is seen a nuclear reactor fuel assembly including a fuel assembly head or top fitting 2 and a fuel assembly foot or base 3 each having a square cross section an elongated water tube or pipe 4 having a square cross section; and an elongated fuel assembly box or can 5 again having a square cross section. The water tube or pipe 4 is disposed centrally in grid-like spacers 6, which are located inside the fuel assembly box or can 5 and are spaced apart from one another as seen in the longitudinal direction of the water tube or pipe 4. A fuel rod 7 containing nuclear fuel engages each hole in the spacers 6. For example, eight of the fuel rods 7 are so-called load-bearing rods, which have threaded bolts on both ends with which they are screwed to the fuel assembly head 2 with a non-illustrated nut and with which they are screwed directly to the fuel assembly foot 3. The other fuel rods 7 have pins located on both ends which loosely engage ducts in the fuel assembly head 2 and in the fuel assembly foot 3. All of the fuel rods 7 are fixed in place with a non-illustrated helical spring which is prestressed for compression. The springs are seated on the threaded bolts or pins on the inside of the fuel assembly head 2 and are supported on the inside of the fuel assembly head 2 and on the associated fuel assembly rod 7. While the fuel assembly head 2 and fuel assembly foot 3 are made of stainless steel, the elongated fuel assembly box or can 5 is manufactured from a zirconium alloy. The elongated fuel assembly box or can 5 is open at both ends and surrounds the fuel assembly head 2 and the fuel assembly foot 3. The inside corners of the upper end of the elongated fuel assembly box or can 5 have non-illustrated sheet-metal strips which are firmly screwed to the upper ends of stay bolts 9 on top of the fuel assembly head 2.

The water tube or pipe 4 is also made of a zirconium alloy. The cross-sectional sides of the water tube or pipe 4 are parallel to the respective adjacent cross-sectional sides of the fuel assembly box or can 5. The webs or cross pieces of the spacers 6 intersect one another at right angles and are also each parallel to two mutually cross-sectional sides of the water tube or pipe 4. All of the cross-sectional sides of the water tube or pipe 4 are spaced apart from the respective adjacent cross-sectional side of the fuel assembly box or can 5 by the same distance.

As FIGS. 1 and 2 show, the water tube or pipe 4 is closed on each end with a plate-like end screen or shield 10 or 11. The end screens or shields 10 and 11 are also made of a zirconium alloy and are firmly welded to the water tube or pipe 4. Each end screen or shield 10 and 11 has four respective flowthrough openings 12 and 13 for liquid water. While the outside of the end screen or shield 10 at the upper end of the water tube or pipe 4 is provided with a pin 14 parallel to the longitudinal direction of the water tube or pipe 4, the outside of the end screen or shield 11 on the lower end of the water tube or pipe 4 has a threaded bolt 15 which is also parallel to the longitudinal direction of the water tube or pipe 4. The pin 14 loosely engages a duct 16 of a grid-like lattice on the inside of the fuel assembly head 2, while the threaded bolt 15 also engages a duct of a grid-like lattice on the inside of the fuel assembly foot 3, but is screwed to the fuel assembly foot 3 with a non-illustrated nut.

As FIG. 2 shows, two plate-like transversely disposed screens or shields or shields 17 and 18, which are made of a zirconium alloy sheet and are spaced apart from one another and from both ends of the water tube or pipe 4, are located inside the water tube or pipe 4. Each of the two plate-like transversely disposed screens or shields 17 and 18 has one flowthrough opening 19 and 20 for liquid water formed therein, each opening being located in the middle of the respective screen or shield.

As is shown in FIG. 3 for the screen or shield 17, the screens or shields 17 and 18 have a raised rim extending in the direction toward the upper end of the water tube or pipe 4 at which they are welded to the inside of the water tube or pipe 4, such as by spot welding.

In a boiling water reactor, the fuel assembly of FIG. 1 is disposed vertically, with coolant in the form of $H_2O$ flowing through it in the fuel assembly box or can 5. The coolant flows through the grid-like lattice of the fuel assembly foot 3 into the fuel assembly box or can 5 and emerges from the fuel assembly box or can 5 through the grid-like lattice of the fuel assembly head 2. Although only liquid water is present inside the water tube or pipe 4, the liquid water on the outside of the water tube or pipe 4 in the fuel assembly box or can 5 is only located at the lower end of the fuel assembly having the foot 3, while wet steam is located at the top having the fuel assembly head 2.

Figure 4:
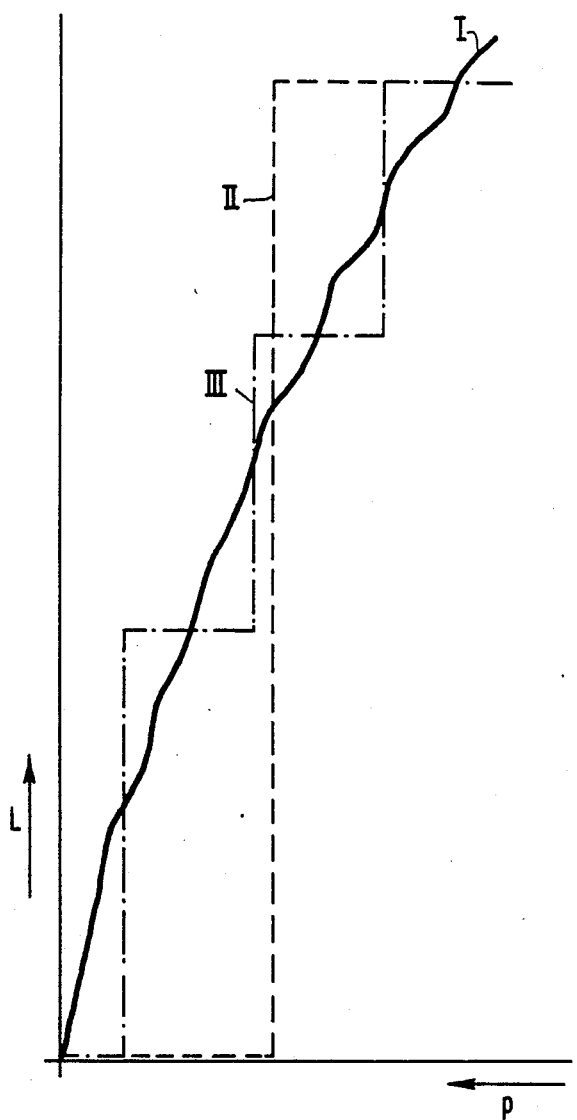
FIG. 4 is a diagram showing the pressure distribution in the water tube or pipe of FIG. 2 in a boiling water reactor.

In the diagram of FIG. 4, the abscissa shows the pressure p and the ordinate shows the length L of the water tube or pipe 4 of FIGS. 1 and 2, beginning at the lower end.

The curve I drawn with a solid line in FIG. 4 represents the coolant pressure on the outside of the water tube or pipe 4 inside the fuel assembly box or can 5 of the fuel assembly of FIG. 1. The broken stepped line II symbolizes the pressure of the liquid water inside the water tube or pipe 4 in a structure wherein the water tube or pipe 4 has no screens or shields 17 and 18 but instead has only identically constructed end screens or shields 10 and 11.

The dot-dash stepped line III in FIG. 4 shows the pressure distribution of the liquid water in the water tube or pipe 4 of FIG. 2 having the two end screens or shields 10 and 11 and the two screens or shields 17 and 18 spaced apart from one another and from both ends of the water tube or pipe 4. The dot-dash stepped line III approximates the solid curve I with a precision that increases with a greater the number of screens or shields disposed inside the water tube or pipe 4 having flowthrough openings for the liquid water. This means that the adaptation of the pressure distribution inside the water tube or pipe 4 to the pressure distribution outside the water tube or pipe 4 improves with an increase in screens or shields located in the water tube or pipe 4 having flowthrough openings for the liquid water. The wall thickness of the water tube or pipe 4 can also be selected to be correspondingly small.

Figure 5:
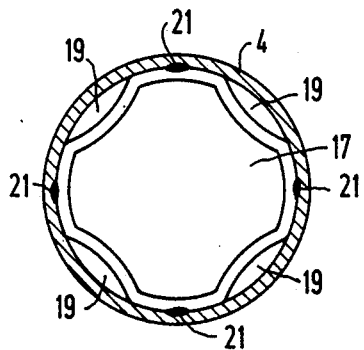
FIGS. 5–11 are sectional views of different embodiments of advantageous screens or shields in water tubes or pipes of nuclear reactor fuel assemblies according to the invention.

As FIG. 5 shows, the cross section of a water tube or pipe 4 in a fuel assembly according to the invention may also be circular. A screen or shield 17 made from a metal sheet may have a raised rim as in FIG. 3, which is welded at two points 21 to the inside of the water tube or pipe 4, but at four other points is spaced apart from the inside of the water tube or pipe 4, forming a flowthrough opening 19 for liquid water at each point.

Figure 6:
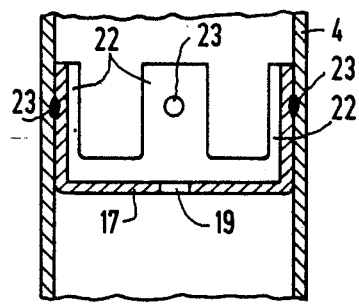

As is seen in the longitudinal section of FIG. 6, a water tube or pipe 4 of circular cross section may have a screen or shield 17 of sheet metal having a central flowthrough opening 19. The screen or shield 17 again has a raised rim having tongues 22 which are welded at points 23 to the inside of the water tube or pipe 4.

Figure 7:
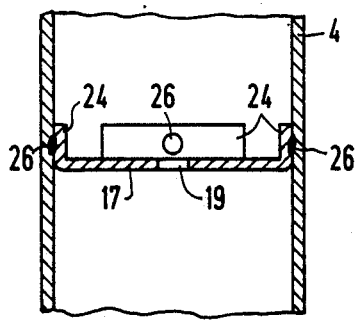

The longitudinal section of FIG. 7 shows a square screen or shield 17 made of sheet metal, in a water tube or pipe 4 with a square cross section. Once again the screen or shield 17 has a central flowthrough opening 19 for liquid water and has raised tongues 24, which are secured with spot welds 26 to the inside of the water tube or pipe 4.

Figure 8:
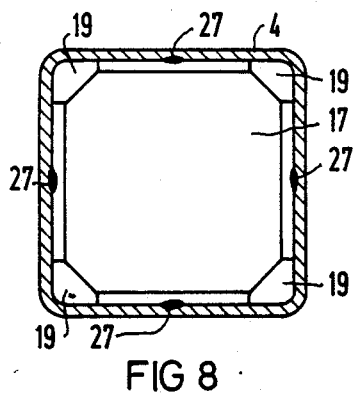

FIG. 8 shows a square cross section of a water tube or pipe 4 and a screen or shield 17 of sheet metal having raised tongues 27 at the rim that are firmly welded to the inside of the water tube or pipe 4. The screen or shield 17 has one flowthrough opening 19 formed therein for liquid water in each of the four corners of the cross section of the water tube or pipe 4, between the inside of the water tube or pipe 4 and the edge of the screen or shield 17.

Figure 9:
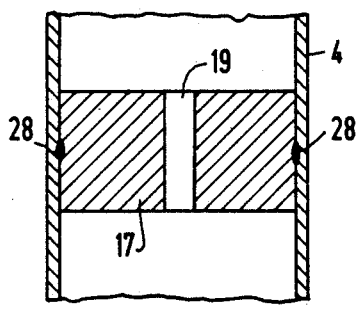

FIG. 9 shows a longitudinal section of a water tube or pipe 4 of circular cross section and a screen or shield 17 of zirconium which is also circular but solid. The surface of the screen or shield inside the water tube or pipe 4 is welded to the inside of the water tube or pipe 4 at points 28 and the screen or shield has a central bore coaxial with the water tube or pipe 4, serving as a flowthrough opening 19 for liquid water.

Figure 10:
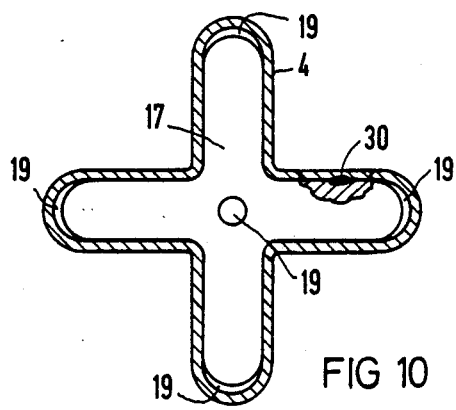
Figure 11:
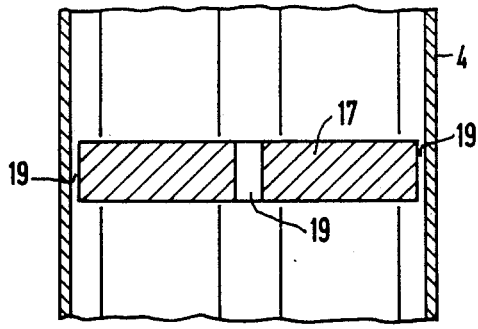

Finally, FIGS. 10 and 11 respectively show a cross section and a longitudinal section of a water tube or pipe 4 with a cross-shaped cross section. In this water tube or pipe 4, a screen or shield 17 of sheet metal cut in the shape of a cross is firmly welded at points 30 to the inside of the water tube or pipe 4. The cross-shaped screen or shield 17 may have a central flowthrough opening 19 for liquid water. However, such flowthrough openings 19 can also be formed between the inside of the water tube or pipe 4 and the ends of the screen or shield 17.

The foregoing is a description corresponding in substance to German Application P 37 11 536.7, dated Apr. 6, 1987, the International priority of which is being claimed for the instant application, and which is hereby made part of this application. Any material discrepancies between the foregoing specification and the aforementioned corresponding German application are to be resolved in favor of the latter.

We claim:

1. Nuclear reactor fuel assembly, comprising an elongated fuel assembly box, fuel rods containing nuclear fuel being mutually spaced apart in said fuel assembly box and parallel to the longitudinal direction of said fuel assembly box, a water tube inside said fuel assembly box parallel to said fuel rods, said water tube having a lower end with an inlet opening and an upper end with an outlet opening for liquid water, a first shield fastened inside said water tube and spaced apart from both of said ends of said water tube, said first shield having a flowthrough opening formed therein for the liquid water, and a second shield fastened inside said water tube and spaced apart from said first shield, said second shield having another flowthrough opening formed therein for the liquid water.

2. Fuel assembly according to claim 1, wherein said second shield is an end shield fastened inside one of said ends of said water tube.

3. Fuel assembly according to claim 2, including another end shield being fastened inside the other of said ends of said water tube, one of said end shields having said outlet opening formed therein and the other of said end shields having said inlet opening formed therein for the liquid water.

4. Fuel assembly according to claim 1, wherein said shield is a metal sheet secured to said water tube.

5. Nuclear reactor fuel assembly, comprising an elongated fuel assembly box, fuel rods containing nuclear fuel being mutually spaced apart in said fuel assembly box and parallel to the longitudinal direction of said fuel assembly box, a water tube inside said fuel assembly box parallel to said fuel rods, said water tube having a lower end with an inlet opening and an upper end with an outlet opening for liquid water, a first shield fastened inside said water tube and spaced apart from both of said ends of said water tube, said first shield and said water tube defining a flowthrough opening therebetween for the liquid water, and a second shield fastened inside said water tube and spaced apart from said first shield, said second shield and said water tube defining another flowthrough opening therebetween for the liquid water.

6. Fuel assembly according to claim 5, wherein said second shield is an end shield fastened inside one of said ends of said water tube.

7. Fuel assembly according to claim 6, including another end shield being fastened inside the other of said ends of said water tube, one of said end shields having said outlet opening formed therein and the other of said end shields having said inlet opening formed therein for the liquid water.

8. Fuel assembly according to claim 5, wherein said shield is a metal sheet secured to said water tube.

* * * * *